(No Model.)
J. HOBSON.
OBSTETRICAL FORCEPS.
No. 416,459. Patented Dec. 3, 1889.
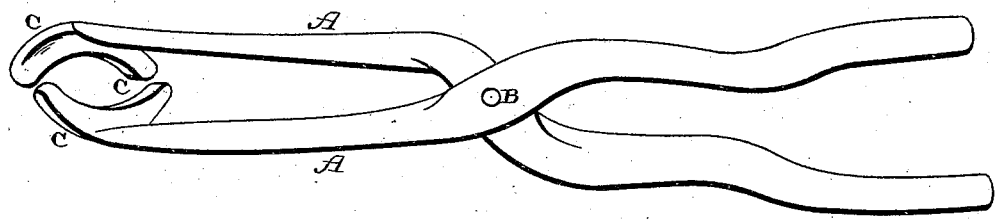
Witnesses:
E. P. Ellis,
L. J. Magie
Inventor:
Jno. Hobson,
per
F. A. Lehmann,
Atty.

UNITED STATES PATENT OFFICE.

JOHN HOBSON, OF JACKSON, JEWELL COUNTY, KANSAS.

OBSTETRICAL FORCEPS.

SPECIFICATION forming part of Letters Patent No. 416,459, dated December 3, 1889.

Application filed September 23, 1889. Serial No. 324,772. (No model.)

*To all whom it may concern:*

Be it known that I, JOHN HOBSON, of Jackson township, in the county of Jewell and State of Kansas, have invented certain new and useful Improvements in Forceps; and I do hereby declare the following to be a full, clear, and exact description of the invention, such as will enable others skilled in the art to which it pertains to make and use it, reference being had to the accompanying drawings, which form part of this specification.

My invention relates to an improvement in forceps; and it consists in the combination of two jaws of unequal length, and which are pivoted together and provided with concave grips upon their ends, as will be more fully described hereinafter.

The object of my invention is to provide a pair of forceps for use in delivering pigs and other young animals where natural birth is prevented, and which are so constructed that the animals will not be injured while being delivered.

The accompanying drawing represents a perspective of a pair of forceps which embodies my invention.

A represents two jaws, which are pivoted together at B, and which have their handle ends given any desired shape or form that may be preferred. The opposite ends of the handles are made of unequal length, and secured to these ends are the concave grip-pieces C, as shown. These grip-pieces are so secured to the handles that their points or ends do not come in direct contact, and thus avoid any possibility of the young animal being injured by pinching while being delivered. One arm is made about a quarter of an inch shorter than the other, so that these grips can be arranged as shown, and which enables them to be easily slipped over the nose and into the neck of the animal being delivered, or where the animal is reversed to catch hold of the leg and obtain a gird-grip, and thus make the delivery certain without injury. Spaces being left between the ends of the grips avoids all possibility of any danger of pinching, causing eruptions or abrasions of the internal parts or of the young animal being delivered.

Having thus described my invention, I claim—

A pair of forceps composed of two jaws, which are pivoted together and provided with concave grips C, the grips being arranged out of line with each other at their points, so that they do not come in contact, substantially as shown and described.

In testimony whereof I affix my signature in presence of two witnesses.

JOHN HOBSON.

Witnesses:
 L. E. HILL,
 W. HAYES, Jr.